US012103015B2

(12) United States Patent
Long et al.

(10) Patent No.: US 12,103,015 B2
(45) Date of Patent: Oct. 1, 2024

(54) PURIFICATION UNIT, PURIFICATION DEVICE AND USING METHOD

(71) Applicant: AirQuality Technology (Shanghai) Co., Ltd., Shanghai (CN)

(72) Inventors: Shidan Long, Shanghai (CN); Shanqing Meng, Shanghai (CN)

( * ) Notice: Subject to any disclaimer, the term of this patent is extended or adjusted under 35 U.S.C. 154(b) by 0 days.

(21) Appl. No.: 18/412,891

(22) Filed: Jan. 15, 2024

(65) Prior Publication Data

US 2024/0165637 A1 May 23, 2024

Related U.S. Application Data

(63) Continuation of application No. PCT/CN2022/142366, filed on Dec. 27, 2022.

(30) Foreign Application Priority Data

Nov. 18, 2022 (CN) ........................ 202211448513.X

(51) Int. Cl.

| | |
|---|---|
| ***B03C 3/68*** | (2006.01) |
| ***B03C 3/41*** | (2006.01) |
| ***B03C 3/70*** | (2006.01) |
| ***B03C 3/78*** | (2006.01) |
| *B03C 3/47* | (2006.01) |

(52) U.S. Cl.

CPC .................. *B03C 3/68* (2013.01); *B03C 3/41* (2013.01); *B03C 3/70* (2013.01); *B03C 3/78* (2013.01); *B03C 2201/10* (2013.01)

(58) Field of Classification Search

CPC .... B03C 3/53; B03C 3/68; B03C 3/70; B03C 3/78; B03C 3/08; B03C 3/368; B03C 3/41; B03C 3/47; B03C 2201/10

See application file for complete search history.

(56) References Cited

U.S. PATENT DOCUMENTS

2020/0368757 A1 11/2020 Lee et al.

FOREIGN PATENT DOCUMENTS

| | | | |
|---|---|---|---|
| CN | 202460832 U | * | 10/2012 |
| CN | 103021640 A | | 4/2013 |
| CN | 203944280 U | | 11/2014 |
| CN | 104501311 A | | 4/2015 |
| CN | 104858060 A | | 8/2015 |
| CN | 107062423 A | | 8/2017 |
| CN | 111437996 A | | 7/2020 |

(Continued)

OTHER PUBLICATIONS

Internation Search Report of PCT/CN2022/142366, Mailed Jul. 21, 2023.

*Primary Examiner* — Christopher P Jones
*Assistant Examiner* — Sonji Turner

(57) ABSTRACT

The present application relates to a purification unit, a purification device and a using method, belonging to the technical field of air purification, the purification unit includes a frame, an electrostatic dust removal zone located inside the frame, the electrostatic dust removal zone is located inside the frame, a support plate located on an outer side of the frame, wherein an insulation member is connected between the support plate and the frame; and a conductive assembly connected to a high-voltage end of the electrostatic dust removal zone and the support plate. A grounding end of the electrostatic dust removal zone is connected to the frame.

14 Claims, 6 Drawing Sheets

(56) References Cited

FOREIGN PATENT DOCUMENTS

| | | | | |
|---|---|---|---|---|
| CN | 113600343 | A | * | 11/2021 |
| JP | H10337498 | A | | 12/1998 |
| JP | H1147637 | A | | 2/1999 |
| KR | 102327810 | B1 | | 11/2021 |

* cited by examiner

PURIFICATION UNIT, PURIFICATION DEVICE AND USING METHOD

CROSS-REFERENCE TO RELATED APPLICATIONS

This application is a continuation of International Patent Application No. PCT/CN2022/142366 with a filing date of Dec. 27, 2022, designating the United States, now pending, and further claims priority to Chinese Patent Application No. 202211448513.X with a filing date of Nov. 18, 2022. The content of the aforementioned applications, including any intervening amendments thereto, are incorporated herein by reference.

TECHNICAL FIELD

The present application relates to a technical field of air purification, and particularly to a purification unit, a purification device and a using method.

BACKGROUND

Currently, the air purification mainly adopts a filtration technology and an electrostatic technology.

The filtration technology purifies the air by filtering or adsorbing pollutants in the air through fibres and fibre-based filter materials. The filtration technology is a mature technology and operates stably, but the labour cost, material cost, operation cost and maintenance cost are very high, and improper maintenance will have certain safety risks. The filter material constantly intercepts pollutants in the air, the gap between the fibres is constantly blocked, the wind resistance is constantly increasing, the filter material is required to be cleaned frequently and replaced, and the bacteria and viruses in the air are retained in the filter material, which will lead to bacterial reproduction, mouldy filter material, and odour.

The electrostatic technology will charge the particles in the air through the ionisation zone, and the particles on the charge through the dust collection zone formed by the electric field is adsorbed, to complete purification. A variety of high-voltage electrostatic dust removal devices designed by use of electrostatic technology principle can purify a wider flow rate and a full range of particles of pollution, to achieve a relative stable use in different temperatures, humidity and other environments, and can be better used in domestic, commercial, industrial, special fields, with a long service life, high purification efficiency, low operating costs, low maintenance costs and other technical characteristics. High-voltage electrostatic dust removal device needs to be cleaned and maintained with the accumulation of particles and other pollutants adsorbed. Part of the high-voltage electrostatic dust removal device in the cleaning and maintenance needs to be shutdown for moving the internal purification unit out, and then the purification unit is cleaned and maintained by human in the open space, and dried by blowing or airing, and then loaded into the equipment. The whole process will cost a lot of labour and time, while affecting the operation of the purification device, thereby causing the loss of downtime and time waiting of user. Part of the high-voltage electrostatic dust removal device does not need to move out of the purification unit, and is cleaned by the automatic cleaning device, but the cleaning effect is not good, cleaning efficiency can not be fully restored after cleaning, the device is wet after cleaning, and needs to be placed for a long period of time for drying, and then can run, otherwise there will be arcing ignition, fire, breakdown, damage of the high-voltage power supply (arcing and breakdown will impact the high-voltage power supply and cause an irreversible damage for the high-voltage power supply), high-voltage power protection, no output and other phenomena, and also increase the downtime and loss of the downtime of the user.

SUMMARY

In view of the various shortcomings of the existing technology, in order to solve the above problems, a purification unit, a purification device and a using method are proposed to reduce the labour cost and time cost generated by the cleaning, to reduce the downtime, to reduce the loss of downtime, and to avoid the damage to the high-voltage power supply.

According to a first aspect of the present application, the present application provides a purification unit, including:

a frame, an electrostatic dust removal zone located inside the frame, wherein after air enters the electrostatic dust removal zone, pollutants in the air are first charged and then adsorbed by an electric field;

a support plate located on an outer side of the frame, wherein an insulation member is connected between the support plate and the frame; and a conductive assembly connected to a high-voltage end of the electrostatic dust removal zone and the support plate, wherein a grounding end of the electrostatic dust removal zone is connected to the frame.

In an embodiment, the frame has a first avoidance hole for the conductive assembly to pass through, and the first avoidance hole corresponds to the insulation member.

In an embodiment, the insulation member is in a same vertical line as the first avoidance hole.

In an embodiment, the insulation member includes an insulation body, a surface of the insulation body is provided with a plurality of insulation protrusions along an axis of the insulation body.

In an embodiment, the high-voltage end of the electrostatic dust removal zone comprises a sawtooth-shaped ionisation member, each side of the sawtooth-shaped ionisation member has staggered ionisation teeth, an ionisation tooth on one side of the sawtooth-shaped ionisation member is located at a centre of a gap between two adjacent ionisation teeth on another side of the sawtooth-shaped ionisation member.

In an embodiment, the grounding end of the electrostatic dust removal zone comprises a grounding member arranged alternatively with the sawtooth-shaped ionisation member, where the grounding member is provided with a second avoidance hole for the conductive assembly to pass through, and a distance from a top to a bottom of the second avoidance hole is greater than a distance from a left side to a right side of the second avoidance hole.

In an embodiment, the conductive assembly is located in an upper part of the second avoidance hole.

According to a second aspect of the present application, the present application provides a purification device, including a frame body and an electric control cabinet, where the frame body is provided with the purification unit, a control system, a high-voltage power supply and an electrical connection end are provided inside the electric control cabinet, where the control system is in communication with the high-voltage power supply, and the high-voltage power supply is electrically connected to the conductive assembly through the electrical connection end.

In an embodiment, a flared spring and an electrical connection member are provided at two ends of the conductive assembly, where the flared spring includes an equal-diameter section and a diverging-diameter section, a surface of the electrical connection member is provided with a threaded groove matching the equal-diameter section, and the equal-diameter section is provided with a convex arc abutting against an end of the electrical connection member.

In an embodiment, the electrical connection end is resiliently electrically connected to the diverging-diameter section.

In an embodiment, the purification device includes a plurality of the purification units, adjacent purification units are detachably connected by a connection unit, wherein the connection unit comprises the flared spring, the electrical connection member and an intermediate connection member, wherein the electrical connection member and the intermediate connection member are located on adjacent purification units respectively, and the intermediate connection member is in interference fit with the diverging-diameter section.

In an embodiment, a diameter of a first end of the intermediate connection member is not larger than a diameter of a second end of the intermediate connection member, and the diameter of the first end of the intermediate connection member is larger than a minimum diameter of the diverging-diameter section and smaller than a maximum diameter of the diverging-diameter section, and the first end of the intermediate connection member is interference fit with the diverging-diameter section.

In an embodiment, the intermediate connection member is a frustum of a cone structure, a diameter of a narrow end of the frustum of a cone structure is greater than a minimum diameter of a diverging-diameter section and less than a maximum diameter of the diverging-diameter section.

In an embodiment, the intermediate connection member is a cylindrical structure, a diameter of the cylindrical structure is greater than a minimum diameter of the diverging-diameter section and less than a maximum diameter of the diverging-diameter section.

In an embodiment, the frame is further provided with a self-cleaning unit, and the self-cleaning unit is configured to spray a cleaning liquid to the purification unit.

According to a third aspect of the present application, the present application provides a using method of the purification device, including:

when the high-voltage power supply is in a direct current (DC) high-voltage power supply mode, air entering the electrostatic dust removal zone through an air inlet, and pollutants in the air being first charged and then adsorbed by the electric field;

cleaning, by a self-cleaning unit, the electrostatic dust removal zone after the high-voltage power supply is turned off;

after a completion of the cleaning, when the high-voltage power supply is in a pulse vortex power supply mode, using a flint shock generated discontinuously to flick cleaning fluid beads adsorbed in the electrostatic dust removal zone, and to purify the pollutants in the air;

switching the high-voltage power supply to the DC high-voltage power supply mode after the cleaning liquid beads are flicked away; and repeating the above processes.

In an embodiment, when the high-voltage power supply is in the DC high-voltage power supply mode, the high-voltage power supply provides a constant voltage DC first high-voltage for an ionisation zone of the electrostatic dust removal zone, and provides a constant voltage DC second high-voltage for a dust collection zone of the electrostatic dust removal zone;

when the high-voltage power supply is in the pulse vortex power supply mode, the high-voltage power supply provides the constant voltage DC first high-voltage to the ionisation zone of the electrostatic dust removal zone, and provides a pulse vortex fourth high-voltage to the dust collection zone of the electrostatic dust removal zone.

In an embodiment, when the high-voltage power supply is in the DC high-voltage power supply mode, the high-voltage power supply provides a constant voltage DC first high-voltage to the ionisation zone of the electrostatic dust removal zone, and provides a constant voltage DC second high-voltage to the dust collection zone of the electrostatic dust removal zone;

when the high-voltage power supply is in the pulse vortex power supply mode, the high-voltage power supply provides a constant voltage DC third high-voltage for the ionisation zone of the electrostatic dust removal zone, wherein the constant voltage DC third high-voltage is gradually increased from low to high to the constant voltage DC first high-voltage; and the high-voltage power supply provides a pulse vortex fourth high-voltage for a dust collection zone of the electrostatic dust removal zone, wherein the pulse vortex fourth high-voltage is gradually increased from low to high to a full pulse vortex fourth high-voltage.

1, using the insulation member and the first avoidance hole, the electrostatic dust removal zone is provided inside the frame, to achieve the electric insulation between the high-voltage end of the electrostatic dust removal zone and the frame, and the insulation member corresponds to the first avoidance hole, which is convenient for cleaning.

2, the second avoidance hole is designed to be similar to a waist-shaped hole, avoiding the residual cleaning liquid from being suspended in a lower end of the conductive assembly after cleaning, causing a reduction of the safety distance, thereby resulting in a reduction of the breakdown voltage, so that safety hazards can be eliminated.

3, sawtooth-shaped ionisation members ensure a full and uniform charge on the pollutants, thus ensuring the purification efficiency before and after cleaning.

4, the flared spring has a convex arc, which produces elastic deformation by compression, and then the elastic force is formed between the electrical connection member and the flared spring, to strengthen the fasteness of the flared spring, so as to ensure that the flared spring and the electrical connection is firmly connected in the process of transport, operation, cleaning, to ensure the reliability of the electrical connection.

5, after the completion of the cleaning, immediately starting the pulse vortex power supply mode, the purification device continues to efficiently remove pollutants, uses a controllable flint shock generated discontinuously to flick cleaning fluid beads adsorbed in the electrostatic dust removal zone, with a high security, no occurrence of breakdown phenomenon, to ensure that after the completion of cleaning, the purification device can be immediately put into use, without shut down for the blow-drying or air drying operation; the pulse vortex power supply mode ensures that the purification device can be put into use immediately after cleaning, such that safe operation is ensured, and the failure phenomenon is not produced, and the high-voltage power supply is avoided to be damaged by direct impact.

6, the pulse vortex power supply mode gradually improves the voltage from low to high, to control the intensity of the fire, until the small cleaning liquid beads are flicked down, and due to the dropped cleaning liquid beads and the flow of airflow, the drying speed of the electrostatic dust removal device zone is accelerated.

DETAILED DESCRIPTION OF THE EMBODIMENTS

In order to enable those skilled in the art to better understand the technical solution of the present application, the following is a clear and complete description of the technical solution of the present application in conjunction with the accompanying drawings of the present application, and based on the embodiments in the present application, other similar embodiments obtained by those skilled in the art in the field without making creative labour shall fall within the scope of the present application. In addition, the following embodiments mention the terms of direction, such as “up”, “down”, “left”, “right”, etc., which are only the directions of the drawings, and therefore, the terms of direction are used to illustrate and not to limit the present application.

Embodiment I

Figure 1:
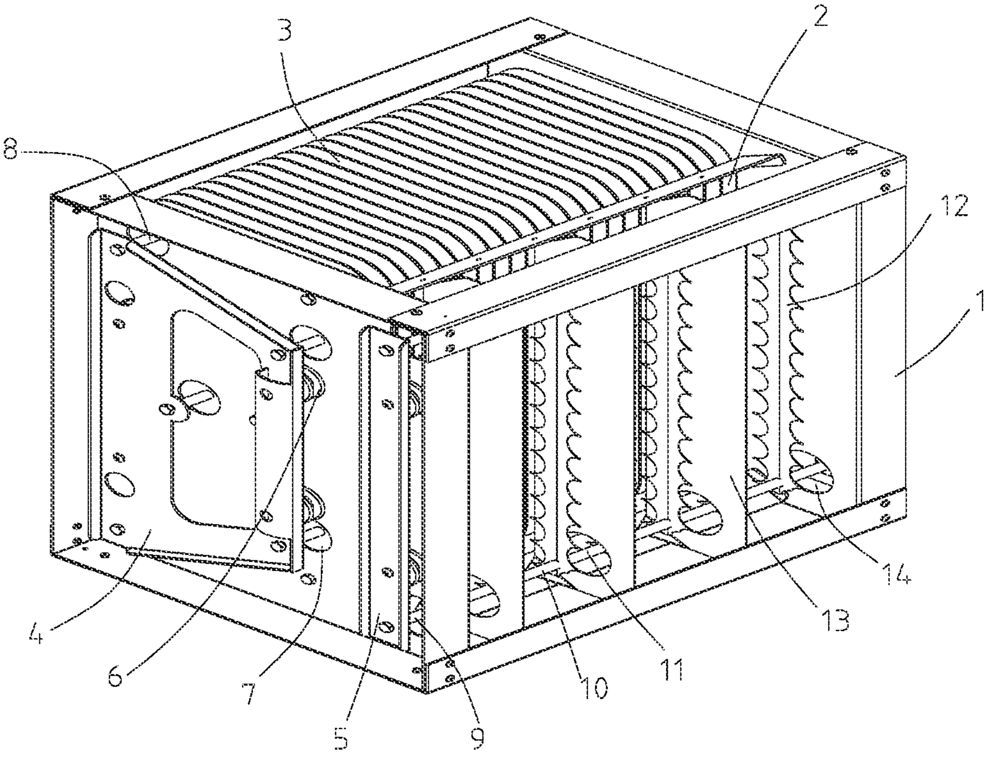
FIG. 1 is a schematic diagram of a purification unit in the present application.

Referring to FIG. 1, a purification unit includes a frame 1, an electrostatic dust removal zone, a support plate, and a conductive assembly. The electrostatic dust removal zone is located inside the frame 1, and the electrostatic dust removal zone includes an ionisation zone 2 and a dust collection zone 3. In particular, after the air enters the electrostatic dust removal zone, pollutants in the air are first charged by the ionisation zone 2 and then adsorbed by an electric field formed inside the dust collection zone 3.

The support plate includes a first support plate 4 and a second support plate 5, the first support plate 4 and the second support plate 5 are located on an outer side of the frame 1, and an insulation member 6 is connected to the first support plate 4, the second support plate 5 and the frame 1. The high-voltage end of the ionisation zone 2 is connected to the second support plate 5 through a conductive assembly, and the high-voltage end of the dust collection zone 3 is connected to the first support plate 4 through the conductive assembly, and the grounding end of the ionisation zone 2 and the grounding end of the dust collection zone 3 are connected to the frame 1.

The frame 1 has a first avoidance hole 7 for the conductive assembly to pass through, the first avoidance hole 7 corresponds to the insulation member 6, the electrostatic dust removal zone is provided inside the frame 1, to achieve an electrical insulation between the high-voltage end of the electrostatic dust removal zone and the frame 1. When the electrostatic dust removal zone is cleaned, the cleaning liquid and mist-like liquid beads are sprayed through the first avoidance hole 7 to the insulation member 6 to clean off the dirt on the surface of the insulation member 6.

In the embodiment, the insulation member 6 is in the same vertical line as the first avoidance hole 7. In some other embodiments, the insulation member 6 and the first avoidance hole 7 may also be on the same inclined line.

Figure 3:
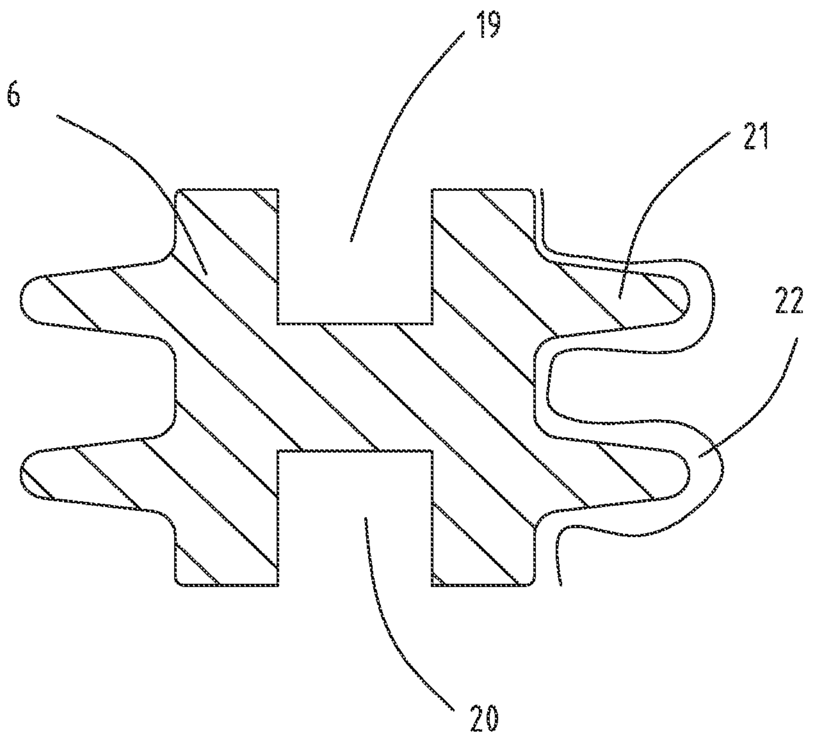
FIG. 3 is a schematic diagram of an insulation member in the present application.

Referring to FIG. 3, the insulation member 6 includes an insulation body, the insulation body is provided with a plurality of insulation protrusions 21 on its surface along its axis, which not only ensures that the cleaning liquid slides off and does not remain, but also maximizes the creepage distance 22 and avoids breakdowns and leakage of electricity, and the top of the insulation body has a first blind hole 19, and the bottom of the insulation body has a second blind hole 20, which facilitates connection with the conductive assembly and the frame 1.

In the embodiment, the insulation member 6 is designed to be like a letter “M”.

Figure 2:
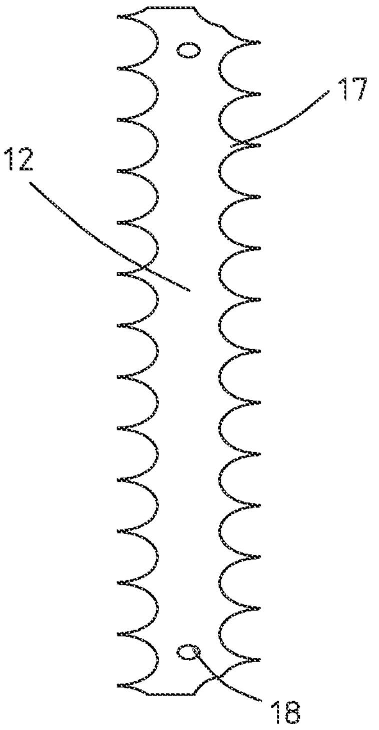
FIG. 2 is a schematic diagram of a sawtooth-shaped ionisation member in the present application.

Referring to FIGS. 1 and 2, the high-voltage end of the ionisation zone 2 includes a sawtooth-shaped ionisation member 12, with staggered ionisation teeth 17 on both sides of the sawtooth-shaped ionisation member 12, which form a beam-type ionisation in the excitation process, and a density of the beam-type ionisation is greatest in the its’ centre and near its tip, where the pollutant passing through is best charged, while the density away from the tip and the centre is a lower. The ionisation tooth on one side of the sawtooth-shaped ionisation member 12 is located at the centre of the gap between two adjacent ionisation teeth on the other side of the sawtooth-shaped ionisation member 12, i.e. the ionisation teeth 17 on both sides are staggered, thereby avoiding uneven distribution of ions generated at the tip of the beam-type ionisation, and the pollutant is more evenly on charge, such that the purification efficiency of the purification unit is ensured.

The grounding end of the ionisation zone 2 includes a grounding member 13 arranged alternatively with the sawtooth-shaped ionisation member 12, the grounding member 13 is provided with a second avoidance hole 14 for the conductive assembly to pass through.

Referring to FIGS. 1 to 3, the conductive assembly includes a first conductive rod 9, a first metal casing 10 and a second metal casing 11, the sawtooth-shaped ionisation member 12 has a third avoidance hole 18, the sawtooth-shaped ionisation member 12 is sandwiched between the first metal casing 10 and the second metal casing 11, and the first conductive rod 9 passes through the first metal casing 10, the third avoidance hole 18, the second metal casing 11, and the second avoidance hole 14 in orders. The outer diameter of the first conductive rod 9 is slightly smaller than the inner diameter of each of the first metal casing 10, the third avoidance hole 18 and the second metal casing 11, and the outer diameter of each of the first metal casing 10 and the second metal casing 11 is larger than the inner diameter of the third avoidance hole 18, by which the upper end and the lower end of the sawtooth-shaped ionisation member 12 are fixed.

The first metal casing 10 passes through the first avoidance hole 7 to connect the second support plate 5, and the first blind hole 19 and the second blind hole 20 are fixed to the first support plate 5 and the second support plate 5 and the frame 1, so that the sawtooth-shaped ionisation member 12 is set up in the ionisation zone 2 since the second support plate 5 and the insulation member 6 are set symmetrically in the left side and the right side, and forms a spatial electrical isolation from the grounding components such as the frame 1 and the grounding member 13.

The residual cleaning liquid in the cleaning process is easy to collect at the bottom of each of the first metal casing 10 or the second metal casing 11 under the effect of gravity, therefore, a distance from the top to the bottom of the second avoidance hole 14 is greater than a distance from the left side to the right side of the second avoidance hole 14 (i.e., a gap between the upper and lower edges of the second avoidance hole 14 is greater than a gap between the left and right edges of the second avoidance hole 14), and the first metal casing 10 or the second metal casing 11 is located in an upper part of the second avoidance hole 14 to ensure a safe breakdown distance. Specifically, the difference between the distance from the top to the bottom of the second avoidance hole 14 and the distance from the left to the right side of the second avoidance hole 14 is 2-10 mm, preferably 5 mm or 6 mm, that is to say, the second avoidance hole 14 is designed to be like a waist shaped hole, to avoid a reduction in the safety voltage and to eliminate the safety hidden danger because the residual cleaning liquid is suspended in the lower end of the conductive assembly after cleaning.

Taking the first metal casing 10 as an example, the distance from the first metal casing 10 to the left and right edges of the second avoidance hole 14 is less than or equal to the distance from the first metal casing 10 to the top of the second avoidance hole 14, and the distance from the first metal casing 10 to the top of the second avoidance hole 14 is less than or equal to the distance from the first metal casing 10 to the bottom of the second avoidance hole 14. According to the safety breakdown voltage designed for the residual cleaning liquid film after cleaning, and the circumstance of a temperature of 25±0.5° C. and a relative humidity of 50±5%, the minimum gap between the first metal casing 10 and the left, right, and top edges of the second avoidance hole is set, and preferably, the thickness of the cleaning liquid film is 0.5-2 mm. According to the safety breakdown voltage designed for the residual cleaning liquid beads after cleaning, and the circumstance of a temperature of 25±0.5° C. and a relative humidity of 50±5%, the gap between the first metal casing 10 and the lower edge of the second avoidance hole is set, preferably, the thickness of the cleaning liquid bead is 2-8 mm, preferably 5 mm. The second metal casing 11 and the first metal casing 10 are set based on the same principle, which will not be repeated. Due to the above gap set, after the self-cleaning is completed, the purification device can be immediately powered on and operates in the pulse vortex power supply mode, without occurrence of the breakdown phenomenon, such that immediate washing and use is achieved and the efficiency is ensured simultaneously.

Figure 7:
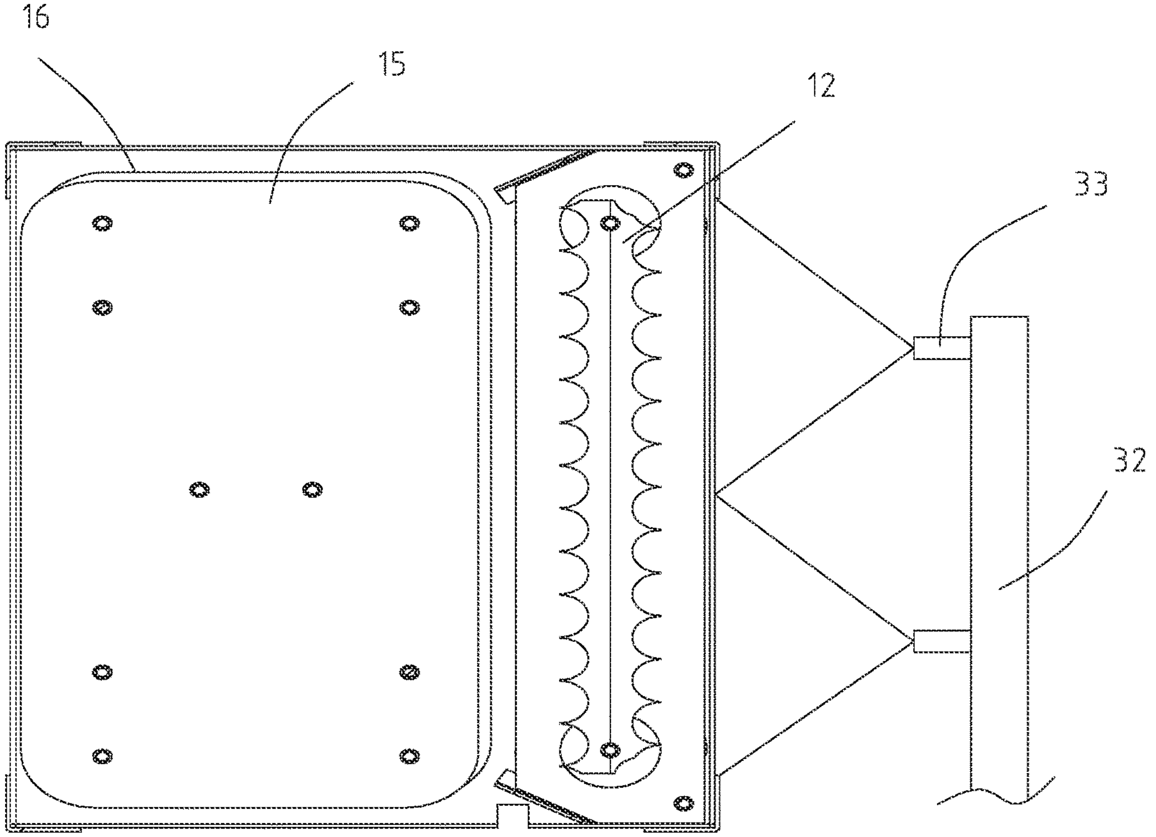
FIG. 7 is a schematic diagram of the assembly of the purification unit and the self-cleaning unit in the present application.

Referring to FIGS. 1 and 7, the dust collection zone 3 includes a first dust collection plate 15 and a second dust collection plate 16, and the first dust collection plate 15 is connected to the first support plate 4 via the second conductive rod 8, while the second dust collection plate 16 is connected to the frame 1. The relative relationship between the second conductive rod 8 and the first dust collection plate 15 and the second dust collection plate 16 can be referred to the relative relationship between the first conductive rod 9 and the sawtooth-shaped ionisation member 12 and the grounding member 13 as described above, which is not be repeated herein. Similarly, the second dust collection plate 16 is also provided with the avoidance hole, similar to a waist-shaped hole, which is designed in the same principle as the second avoidance hole 14, which is not be repeated herein, but their difference is that the high input voltages of the ionisation zone 2 and the dust collection zone 3 are different, and the avoidance hole on the second dust collection plate 16 and the second avoidance hole 14 are different in their sizes.

In addition, the second avoidance hole 14 may also be a circular hole, taking the first metal casing 10 as an example, the first metal casing 10 is located in an upper part of the second avoidance hole 14, but such structural design leads to occupation of a larger space of the second avoidance hole 14, which indirectly affects the functioning effect of the grounding member 13 or the second dust collection plate 16.

Embodiment II

Referring to FIGS. 4 to 7, a purification device includes a frame body and an electrical control cabinet, the frame body is provided with the purification unit 25, the electrical control cabinet is provided with a control system, a high-voltage power supply and an electrical connection end inside, the control system is in communication with the high-voltage power supply, and the high-voltage power supply is electrically connected to the conductive assembly through the electrical connection end. In addition, the frame body is provided with a slide rail inside along which the purification unit 25 is pushed into the frame body.

An end of the conductive assembly is provided with an flared spring 26 and an electrical connection member 28, the flared spring 26 includes an equal-diameter section 29 and diverging-diameter section 30 connected to each other, the diameter of the diverging-diameter section 30 increases gradually to form a flared mouth-like structure. The small diameter end of the diverging-diameter section 30 is connected to the equal-diameter section 29, and a screw pitch of the diverging-diameter section 30 increases gradually from the small diameter end to the large diameter end thereof, the maximum diameter of the diverging-diameter section 30 is 3-5 times as large as the diameter of the equal-diameter section.

The surface of the electrical connection member 28 has a threaded groove matching the equal-diameter section 29, which is primarily intended to fit the electrical connection member 28. The diverging-diameter section 30 gradually increases the diameter of the spring to increase the contact area, and the electrical connection end is elastically electrically connected to the diverging-diameter section 30, to ensure that the purification unit 25 is automatically disconnected when the electrical cabinet is opened.

The equal-diameter section 29 has a convex arc 31 abutting against the end of the electrical connection member 28, and there are at least one the convex arcs 31. Specifically, a height of the convex arc 31 is 1-3 mm, preferably 1.5 mm or 2 mm, and the curvature of the convex arc 31 is no more than 30°, thereby ensuring its elastic deformation, presetting the elastic force, and improving the fastness of the equal-diameter section 29 in connection with the electrical connection member 28. When there are a plurality of the convex arcs 31, they are centrally symmetrical, with good uniformity.

There are a plurality of purification units 25, and adjacent purification units 25 are detachably connected by a connection unit. The connection unit includes the flared spring 26, the electrical connection member 28, and an intermediate connection member 27. The electrical connection member 28 and the intermediate connection member 27 are located on adjacent purification units respectively, the intermediate connection member 27 is in interference fit with the diverging-diameter section 30, thereby increasing contact area and ensuring reliability of the electrical connection, and the structure of the diverging-diameter section 30 have a certain fault-tolerant space, which can be better aligned when assembling a plurality of the diverging-diameter section 30 on site to ensure contact. The intermediate connection member 27 can be selectively removed when the plurality of purification units 25 are not required to be spliced.

When the equal-diameter section 29 is rotated to the end of the electrical connection member 28, the convex arcs 31 is compressed to produce an elastic deformation, and thus an elastic force is formed between the end of the electrical connection member 28 and the flared spring 26, which strengthens the fastness of the flared spring 26, thereby ensuring that the flared spring 26 is firmly connected to the electrical connection member 28 during transport, operation, and cleaning, and ensuring the reliability of the electrical connection.

The diameter of the first end of the intermediate connection member 27 is not larger than the diameter of the second end of the intermediate connection member 27, and the diameter of the first end of the intermediate connection member 27 is larger than the minimum diameter of the diverging-diameter section 30 and smaller than the maximum diameter of the diverging-diameter section 30.

In the embodiment, the intermediate connection member 27 is a cylindrical structure, the diameter of the first end of the intermediate connection member 27 is equal to the diameter of the second end of the intermediate connection member 27, and the diameter of the cylindrical structure is greater than the minimum diameter of the diverging-diameter section 30 and less than the maximum diameter of the diverging-diameter section 30. In some other embodiments, the intermediate connection member 27 is a circular table structure, the diameter of the narrow end (first end) of the circular table structure is greater than the minimum diameter of the diverging-diameter section 30 and less than the maximum diameter of the diverging-diameter section 30.

The frame body is further provided with a self-cleaning unit 24, the self-cleaning unit 24 is located on a windward and/or outward side of the electrostatic dust removal zone for spraying the cleaning liquid to the purification unit 25.

The self-cleaning unit 24 mainly consists of a cleaning pump, a cleaning box, a pipeline, a valve, a nozzle, a cleaning agent pump, a cleaning agent box, an electric heating system, a sensor and so on, and also includes a sewage recycling system, which mainly consists of a sewage pump, a sewage tank, a filtration unit and so on. According to the site conditions and user requirements, it requires different accessories and pipelines. The cleaning pumps and cleaning agent pumps run according to the preset flow rate, the mixed cleaning liquid is transported through the pipeline 32, and sprayed out by the nozzle 33 to clean the purification unit. The nozzle 33 is provided at the upper and lower rows, and can cover the windward side of the ionisation zone, the nozzle 33 has a high voltage, the sprayed cleaning liquid rush out a certain distance and is atomised to disperse, with a good uniformity. The cleaning liquid sprayed from the nozzle 33 in different flow directions and the atomised cleaning liquid can pass through the first avoidance hole 7 to clean off the dirt on the ceramic member 6. The cleaning liquid has a strong decontamination ability and can quickly dissolve the pollutants accumulated in the purification unit 25, and the dissolved pollutants accompanied by the cleaning liquid flow to a dirt accumulation tank under the purification unit 25, and the bottom of the dirt accumulation tank is provided with a hole for connecting an external sewage discharge line. In addition, the pipeline 32 and the nozzle 33 can be added on the air outlet of the dust collection zone for bidirectional spraying.

Figure 4:
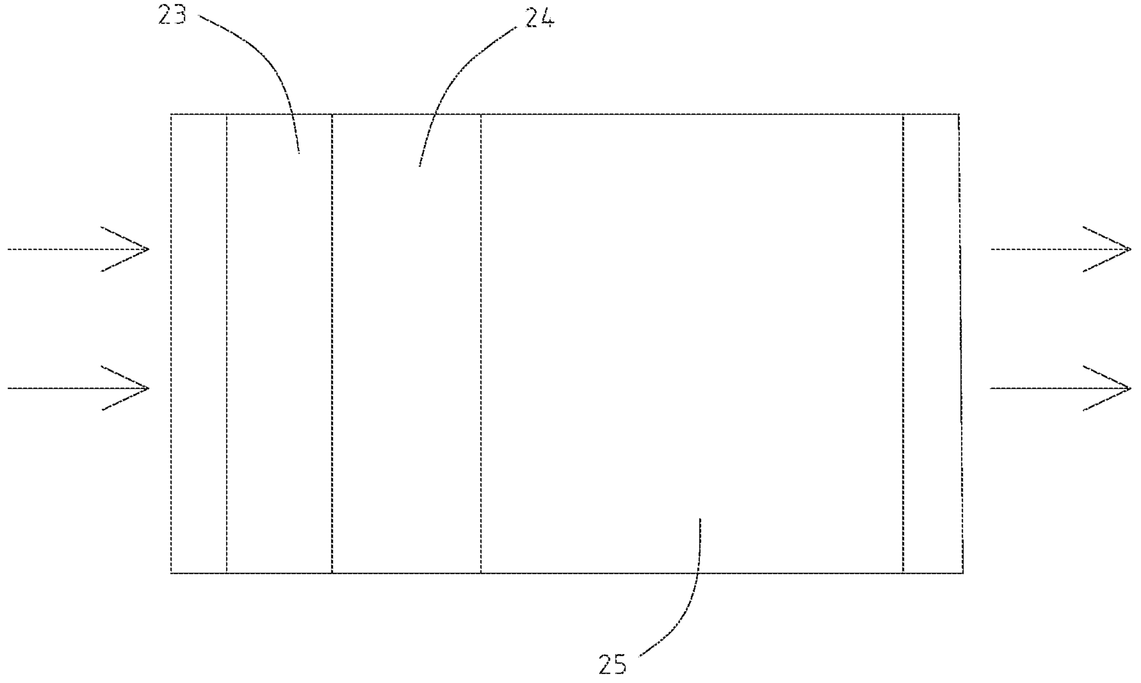
FIG. 4 is a schematic diagram of a purification device in the present application.
Figure 5:
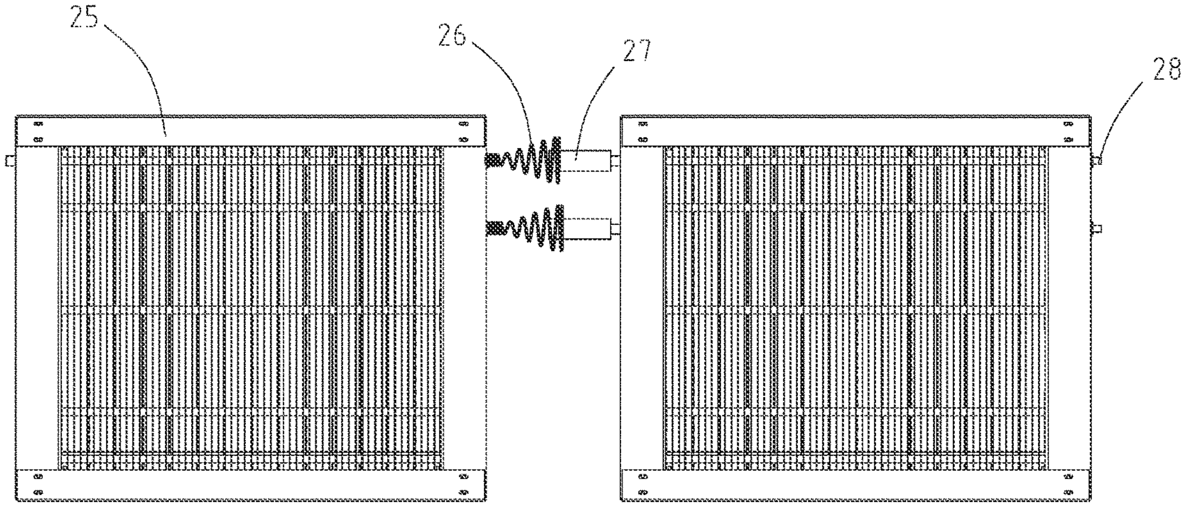
FIG. 5 is a schematic diagram of the assembly of two purification units in the present application.
Figure 6:
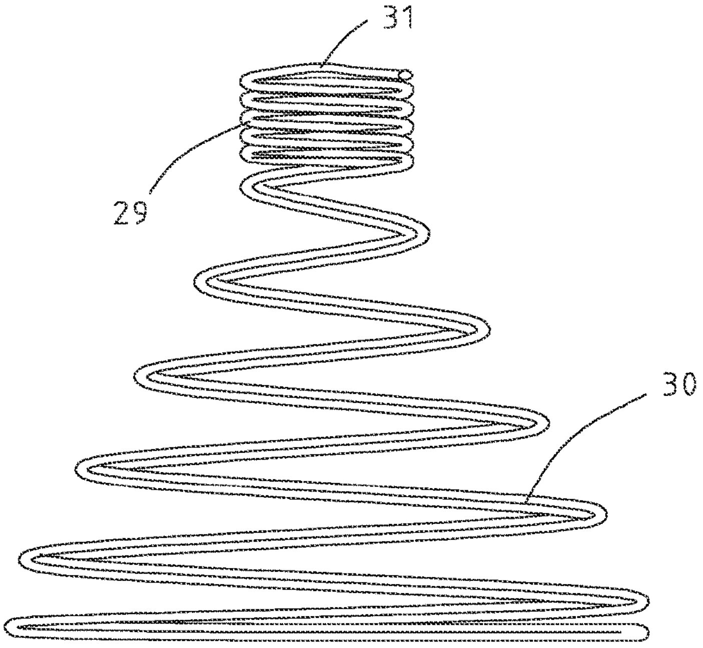
FIG. 6 is a schematic diagram of a flared spring in the present application.
Figure 8:
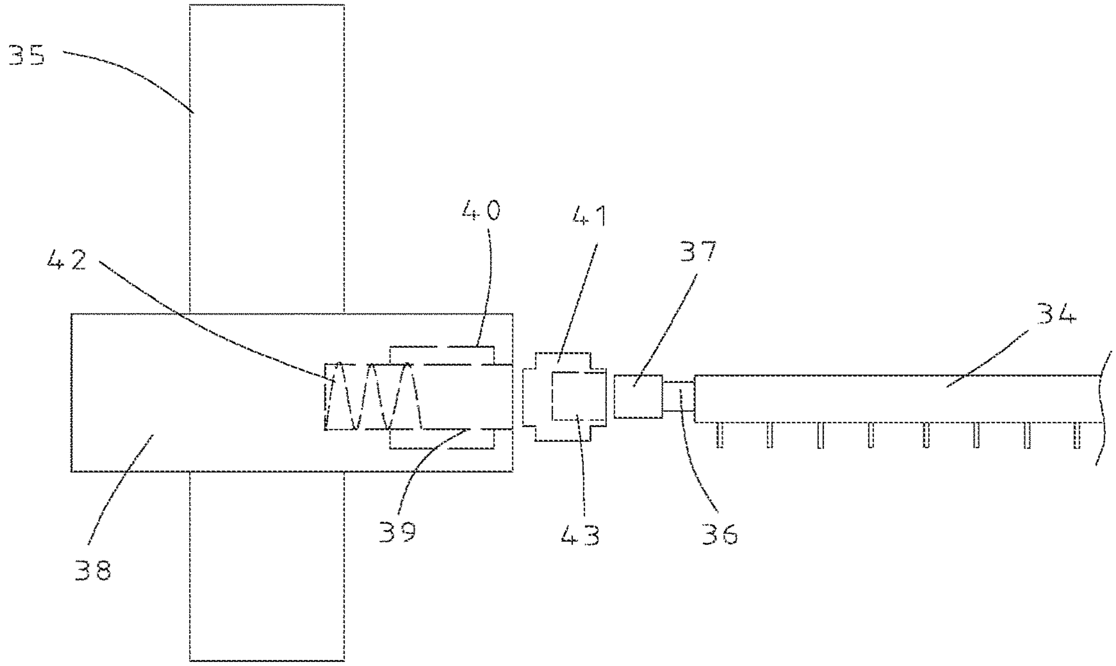
FIG. 8 is a schematic diagram of the disassembly of the cleaning assembly in the present application.
Figure 9:
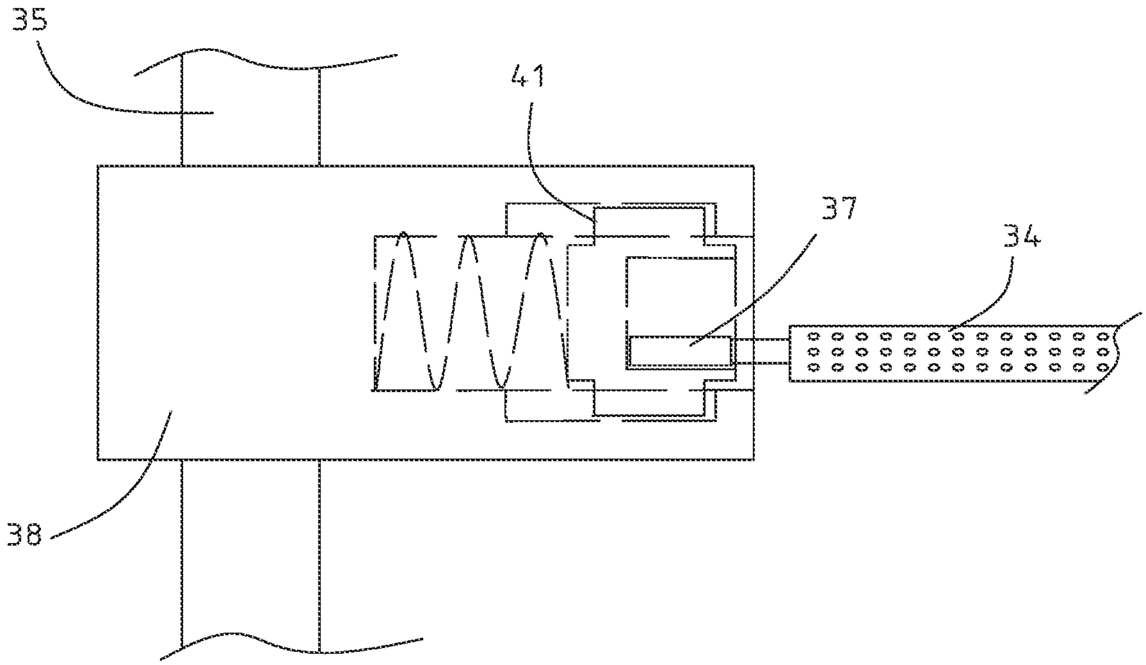
FIG. 9 is a schematic diagram of the cleaning assembly in a working state in the present application.

Referring to FIG. 4, FIG. 8, and FIG. 9, the frame body is further provided with a filter unit 23, the filter unit 23 includes a filter mesh and a cleaning assembly disposed on the side of the filter mesh, the cleaning assembly includes a brush 34 and screws 35 disposed at two ends of the brush 34, the brush 34 is fixed to the brush holder 36, and the end of the brush holder 36 is rotatably connected to the screws 35, and a wing bar 37 is provided vertically to the brush holder 36. The cleaning assembly further includes a cleaning motor, the cleaning motor drives the screws 35 located at both ends of the brush 34 to rotate synchronously by means of a gear and a chain.

The screw 35 is provided with a mounting seat 38 threaded therewith, the mounting seat 38 has a mounting groove 39 and a guiding groove 40, the guiding grooves 40 are located above and below the mounting grooves 39 respectively, and the length of the guiding groove 40 is less than the length of the mounting groove 39. The mounting groove 39 is provided with a mounting block 41, the top of the mounting block 41 has a guiding block embedded in the guiding groove 40. That is, the mounting block 41 is limited by the guide block being embedded in the guiding groove 40. The mounting block 41 has a containing cavity 43, the sides of which have a bar-shaped through hole in communication with the containing cavity 43.

When assembling, the wing bars 37 are embedded into an interior of the containing cavity 43 from a bar-shaped through hole, and a spring 42 is provided between the mounting block 41 and the mounting groove 39, and the spring 42 is squeezed to deform by the mounting block 41, so as to facilitate the installation of the wing bars 37 into the interior of the containing cavity 43 to be the two ends of the brush 34 respectively. Then, the brush 34, the brush holders 36 and the wing bars 37 are synchronously rotated to induce the wing bars 37 to be perpendicular to the bar-shaped through holes, at which time the brushes 34 are facing the filter screen. Since the height of the wing bar 37 is smaller than the length of the bar-shaped through hole and larger than the width of the bar-shaped through hole, and a width of the wing bar 37 is smaller than a width of the containing cavity 43, it is ensured that the rotated wing bar 37 will not come out from the bar-shaped through hole, i.e., the bar-shaped through hole limits the rotated wing bar 37. The cleaning motor drives the screws 35 located at both ends of the brush 34 to rotate synchronously through gears and chains, prompting the mounting seat 38, the mounting block 41, and the brushes to move up and down along the screws 35, thereby cleaning the brushes 34.

Figure 10:
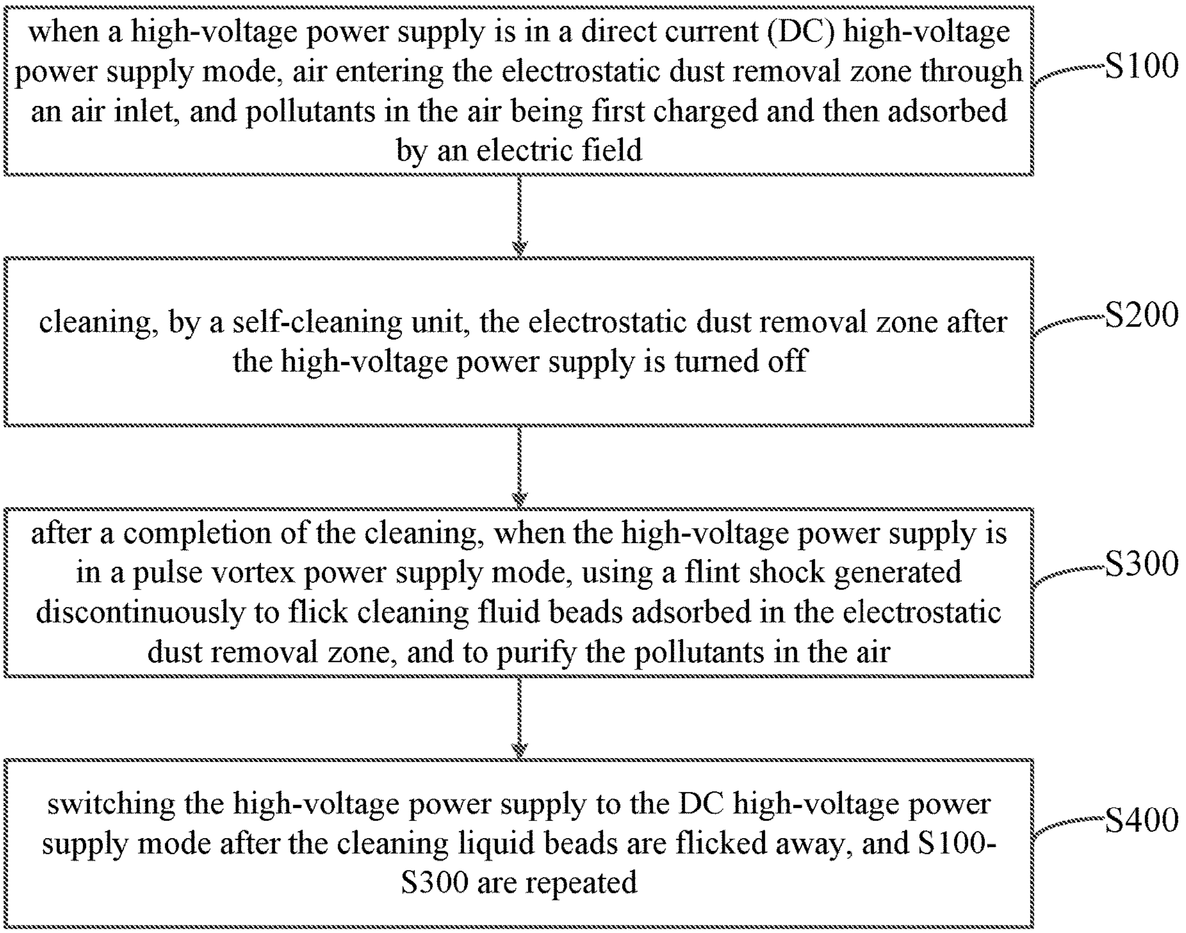
FIG. 10 is a flowchart of a using method of the purification device in the present application.

Referring to FIG. 10, a using method of a purification device includes:

S100, when a high-voltage power supply is in a direct current (DC) high-voltage power supply mode, air entering the electrostatic dust removal zone through an air inlet, and pollutants in the air being first charged and then adsorbed by an electric field;

S200, cleaning, by a self-cleaning unit, the electrostatic dust removal zone after the high-voltage power supply is turned off;

S300, after a completion of the cleaning, when the high-voltage power supply is in a pulse vortex power supply mode, using a flint shock generated discontinuously to flick cleaning fluid beads adsorbed in the electrostatic dust removal zone, and to purify the pollutants in the air;

S400, switching the high-voltage power supply to the DC high-voltage power supply mode after the cleaning liquid beads are flicked away, and S100-S300 are repeated.

When the high-voltage power supply is in the DC high-voltage power supply mode, the high-voltage power supply provides a constant voltage DC first high-voltage for an ionisation zone of the electrostatic dust removal zone, and provides a constant voltage DC second high-voltage for a dust collection zone of the electrostatic dust removal zone; when the high-voltage power supply is in the pulse vortex power supply mode, the high-voltage power supply provides the constant voltage DC first high-voltage to the ionisation zone of the electrostatic dust removal zone, and provides a pulse vortex fourth high-voltage to the dust collection zone of the electrostatic dust removal zone.

In other embodiments, when the high-voltage power supply is in the DC high-voltage power supply mode, the high-voltage power supply provides a constant voltage DC first high-voltage to the ionisation zone of the electrostatic dust removal zone, and provides a constant voltage DC second high-voltage to the dust collection zone of the electrostatic dust removal zone; when the high-voltage power supply is in the pulse vortex power supply mode, the high-voltage power supply provides a constant voltage DC third high-voltage for the ionisation zone of the electrostatic dust removal zone, wherein the constant voltage DC third high-voltage is gradually increased from low to high to the constant voltage DC first high-voltage; and the high-voltage power supply provides a pulse vortex fourth high-voltage for a dust collection zone of the electrostatic dust removal zone, wherein the pulse vortex fourth high-voltage is gradually increased from low to high to a full pulse vortex fourth high-voltage.

The constant voltage DC third high-voltage is gradually increased from low to high to the constant voltage DC first high-voltage based on circuit feedback or within a time threshold. The pulse vortex fourth high-voltage is gradually increased from low to high and to the full pulse vortex fourth high-voltage within the time threshold. By gradually increasing the intensity of the voltage, the firing intensity is controlled to gradually flick the cleaning liquid beads adsorbed in the electrostatic dust removal zone to avoid impacting the high-voltage power supply and affecting the life of the high-voltage power supply.

In an embodiment, the constant voltage DC third high-voltage is the constant voltage DC first high-voltage of 0.4 times, which is gradually increased to the constant voltage DC first high-voltage according to the circuit feedback or within a time threshold, wherein the circuit feedback mainly includes the current value and the frequency of striking a light per unit time. In some other embodiments, the constant voltage DC third high-voltage may further be the constant voltage DC first high-voltage of 0.5 times, 0.6 times, 0.7 times or 0.8 times.

In an embodiment, the pulse vortex fourth high-voltage of 0.4 times is first provided to the dust collection zone, and then the pulse vortex fourth high-voltage of 0.1-0.2 times is further added to the dust collection zone every 10-15 minutes, until the pulse vortex fourth high-voltage is increased to the full pulse vortex fourth high-voltage within a time threshold. In some other embodiments, a pulse vortex fourth high-voltage of 0.5 times, 0.6 times, 0.7 times, or 0.8 times may also be provided to the dust collection zone first.

The constant voltage DC first high-voltage, the constant voltage DC second high-voltage, the constant voltage DC third high-voltage, and the pulse vortex fourth high-voltage may be positive or negative. The pulse vortex power supply mode uses the change of the magnetic field generated by the pulse vortex, which in turn generates the pulse vortex fourth high-voltage.

The above is a detailed description of the present application, and is only the better embodiment of the present application, when the present application can not limit the scope of the present application, that is, equal changes and modifications in accordance with the scope of the present application should still belong to the scope of the present application.

What is claimed is:

1. A method of using a purification device, wherein the purification device comprises:

a frame body and an electric control cabinet, wherein the frame body is provided with a purification unit, a control system, a high-voltage power supply and an electrical connection end are provided inside the electric control cabinet, wherein the control system is in communication with the high-voltage power supply, and the high-voltage power supply is electrically connected to a conductive assembly through the electrical connection end;

wherein the purification unit comprises:

a frame, an electrostatic dust removal zone located inside the frame, wherein after air enters the electrostatic dust removal zone, pollutants in the air are first charged and then adsorbed by an electric field;

a support plate located on an outer side of the frame, wherein an insulation member is connected between the support plate and the frame; and a conductive assembly connected to a high-voltage end of the electrostatic dust removal zone and the support plate, wherein a grounding end of the electrostatic dust removal zone is connected to the frame;

wherein the high-voltage end of the electrostatic dust removal zone comprises a sawtooth-shaped ionisation member, the grounding end of the electrostatic dust removal zone comprises a grounding member arranged alternatively with the sawtooth-shaped ionisation member; the grounding member is provided with a second avoidance hole for the conductive assembly to pass through, and a distance from a top to a bottom of the second avoidance hole is greater than a distance from a left side to a right side of the second avoidance hole;

the conductive assembly is located in an upper part of the second avoidance hole;

a flared spring and an electrical connection member are provided at two ends of the conductive assembly and, wherein the flared spring comprises an equal-diameter section and a diverging-diameter section, a surface of the electrical connection member is provided with a threaded groove matching the equal-diameter section, and the equal-diameter section is provided with a convex arc abutting against an end of the electrical connection member; the electrical connection end is resiliently electrically connected to the diverging-diameter section;

the purification device comprises a plurality of the purification units, adjacent purification units are detachably connected by a connection unit, wherein the connection unit comprises the flared spring, the electrical connection member and an intermediate connection member, wherein the electrical connection member and the intermediate connection member are located on adjacent purification units respectively, and the intermediate connection member is in interference fit with the diverging-diameter section;

wherein the method of using the purification device comprises:

when the high-voltage power supply is in a direct current (DC) high-voltage power supply mode, air entering the electrostatic dust removal zone through an air inlet, and pollutants in the air being first charged and then adsorbed by the electric field;

cleaning, by a self-cleaning unit, the electrostatic dust removal zone after the high-voltage power supply is turned off;

after a completion of the cleaning, when the high-voltage power supply is in a pulse vortex power supply mode, using a flint shock generated discontinuously to flick cleaning fluid beads adsorbed in the electrostatic dust removal zone, and to purify the pollutants in the air;

switching the high-voltage power supply to the DC high-voltage power supply mode after the cleaning fluid beads are flicked away;

wherein when the high-voltage power supply is in the DC high-voltage power supply mode, the high-voltage power supply provides a constant voltage DC first high-voltage for an ionisation zone of the electrostatic dust removal zone, and provides a constant voltage DC second high-voltage for a dust collection zone of the electrostatic dust removal zone;

when the high-voltage power supply is in the pulse vortex power supply mode, the high-voltage power supply provides the constant voltage DC first high-voltage to the ionisation zone of the electrostatic dust removal zone, and provides a pulse vortex fourth high-voltage to the dust collection zone of the electrostatic dust removal zone.

2. The method of using the purification device according to claim 1, wherein the frame has a first avoidance hole for the conductive assembly to pass through, and the first avoidance hole corresponds to the insulation member.

3. The method of using the purification device according to claim 2, wherein the insulation member is in a same vertical line as the first avoidance hole.

4. The method of using the purification device according to claim 2, wherein the insulation member comprises an insulation body, a surface of the insulation body is provided with a plurality of insulation protrusions along an axis of the insulation body.

5. The method of using the purification device according to claim 1, wherein each side of the sawtooth-shaped ionisation member has staggered ionisation teeth, an ionisation tooth on one side of the sawtooth-shaped ionisation member is located at a centre of a gap between two adjacent ionisation teeth on another side of the sawtooth-shaped ionisation member.

6. The method of using the purification device according to claim 1, wherein a diameter of a first end of the intermediate connection member is not larger than a diameter of a second end of the intermediate connection member, and the diameter of the first end of the intermediate connection member is larger than a minimum diameter of the diverging-diameter section and smaller than a maximum diameter of the diverging-diameter section, and the first end of the intermediate connection member is interference fit with the diverging-diameter section.

7. The method of using the purification device according to claim 1, wherein the frame is further provided with a self-cleaning unit, and the self-cleaning unit is configured to spray a cleaning fluid to the purification unit.

8. A method of using a purification device, wherein the purification device comprises:

a frame body and an electric control cabinet, wherein the frame body is provided with a purification unit, a control system, a high-voltage power supply and an electrical connection end are provided inside the electric control cabinet, wherein the control system is in communication with the high-voltage power supply, and the high-voltage power supply is electrically connected to the conductive assembly through the electrical connection end;

wherein the purification unit comprises:

a frame, an electrostatic dust removal zone located inside the frame, wherein after air enters the electrostatic dust removal zone, pollutants in the air are first charged and then adsorbed by an electric field;

a support plate located on an outer side of the frame, wherein an insulation member is connected between the support plate and the frame; and a conductive assembly connected to a high-voltage end of the electrostatic dust removal zone and the support plate, wherein a grounding end of the electrostatic dust removal zone is connected to the frame;

wherein the high-voltage end of the electrostatic dust removal zone comprises a sawtooth-shaped ionisation member, the grounding end of the electrostatic dust removal zone comprises a grounding member arranged alternatively with the sawtooth-shaped ionisation member; the grounding member is provided with a second avoidance hole for the conductive assembly to pass through, and a distance from a top to a bottom of the second avoidance hole is greater than a distance from a left side to a right side of the second avoidance hole;

the conductive assembly is located in an upper part of the second avoidance hole;

a flared spring and an electrical connection member are provided at two ends of the conductive assembly and, wherein the flared spring comprises an equal-diameter section and a diverging-diameter section, a surface of the electrical connection member is provided with a threaded groove matching the equal-diameter section, and the equal-diameter section is provided with a convex arc abutting against an end of the electrical connection member; the electrical connection end is resiliently electrically connected to the diverging-diameter section;

the purification device comprises a plurality of the purification units, adjacent purification units are detachably connected by a connection unit, wherein the connection unit comprises the flared spring, the electrical connection member and an intermediate connection member, wherein the electrical connection member and the intermediate connection member are located on adjacent purification units respectively, and the intermediate connection member is in interference fit with the diverging-diameter section;

wherein the method of using the purification device comprises:

when the high-voltage power supply is in a direct current (DC) high-voltage power supply mode, air entering the electrostatic dust removal zone through an air inlet, and pollutants in the air being first charged and then adsorbed by the electric field;

cleaning, by a self-cleaning unit, the electrostatic dust removal zone after the high-voltage power supply is turned off;

after a completion of cleaning, when the high-voltage power supply is in a pulse vortex power supply mode, using a flint shock generated discontinuously to flick cleaning fluid beads adsorbed in the electrostatic dust removal zone, and to purify the pollutants in the air;

switching the high-voltage power supply to the DC high-voltage power supply mode after the cleaning fluid beads are flicked away;

wherein when the high-voltage power supply is in the DC high-voltage power supply mode, the high-voltage power supply provides a constant voltage DC first high-voltage to the ionisation zone of the electrostatic dust removal zone, and provides a constant voltage DC second high-voltage to a dust collection zone of the electrostatic dust removal zone;

when the high-voltage power supply is in the pulse vortex power supply mode, the high-voltage power supply provides a constant voltage DC third high-voltage for the ionisation zone of the electrostatic dust removal zone, wherein the constant voltage DC third high-voltage is gradually increased from low to high to the constant voltage DC first high-voltage; and the high-voltage power supply provides a pulse vortex fourth high-voltage for the dust collection zone of the electrostatic dust removal zone, wherein the pulse vortex fourth high-voltage is gradually increased from low to high to a full pulse vortex fourth high-voltage.

9. The method of using the purification device according to claim 8, wherein the frame has a first avoidance hole for the conductive assembly to pass through, and the first avoidance hole corresponds to the insulation member.

10. The method of using the purification device according to claim 9, wherein the insulation member is in a same vertical line as the first avoidance hole.

11. The method of using the purification device according to claim 9, wherein the insulation member comprises an insulation body, a surface of the insulation body is provided with a plurality of insulation protrusions along an axis of the insulation body.

12. The method of using the purification device according to claim 8, wherein each side of the sawtooth-shaped ionisation member has staggered ionisation teeth, an ionisation tooth on one side of the sawtooth-shaped ionisation member is located at a centre of a gap between two adjacent ionisation teeth on another side of the sawtooth-shaped ionisation member.

13. The method of using the purification device according to claim 8, wherein a diameter of a first end of the intermediate connection member is not larger than a diameter of a second end of the intermediate connection member, and the diameter of the first end of the intermediate connection member is larger than a minimum diameter of the diverging-diameter section and smaller than a maximum diameter of the diverging-diameter section, and the first end of the intermediate connection member is interference fit with the diverging-diameter section.

14. The method of using the purification device according to claim 8, wherein the frame is further provided with a self-cleaning unit, and the self-cleaning unit is configured to spray a cleaning fluid to the purification unit.

* * * * *